United States Patent [19]

Elton

[11] Patent Number: 5,286,087
[45] Date of Patent: Feb. 15, 1994

[54] SEAT ASSEMBLY WITH LUMBAR SUPPORT MECHANISM

[75] Inventor: Robert D. Elton, Ann Arbor, Mich.

[73] Assignee: Hoover Universal, Inc., Plymouth, Mich.

[21] Appl. No.: 973,616

[22] Filed: Nov. 9, 1992

[51] Int. Cl.⁵ .................................................. A47C 3/00
[52] U.S. Cl. ............................ 297/284.8; 297/284.1
[58] Field of Search ............. 297/284.8, 284.4, 284.1, 297/284.7

[56] References Cited

U.S. PATENT DOCUMENTS

| | | | |
|---|---|---|---|
| 3,378,299 | 4/1968 | Sandor | 297/284.4 |
| 3,973,797 | 8/1976 | Obermeier et al. | 297/284.4 |
| 4,162,807 | 7/1979 | Yoshimura | 297/284.4 |
| 4,449,751 | 5/1984 | Murphy et al. | 297/284.4 |
| 4,534,592 | 8/1985 | Hattori | 297/284.4 |
| 4,564,235 | 1/1986 | Hatsutta et al. | 297/284.4 |
| 4,565,406 | 1/1986 | Suzuki | 297/284.4 |
| 4,725,095 | 2/1988 | Benson et al. | 297/284.1 |
| 4,886,316 | 12/1989 | Suzuyama et al. | 297/284.4 |

Primary Examiner—James R. Brittain
Assistant Examiner—Milton Nelson, Jr.
Attorney, Agent, or Firm—Harness, Dickey & Pierce

[57] ABSTRACT

A mechanical lumbar support having an adjustment mechanism with a cam for effecting adjustment of the lumbar support member position. The cam is coupled to the lumbar support member through a linkage which enables the cam and actuating knob to be located at the optimum position for reaching and operating by a seat occupant, independent of the location of the lumbar support mechanism.

13 Claims, 4 Drawing Sheets

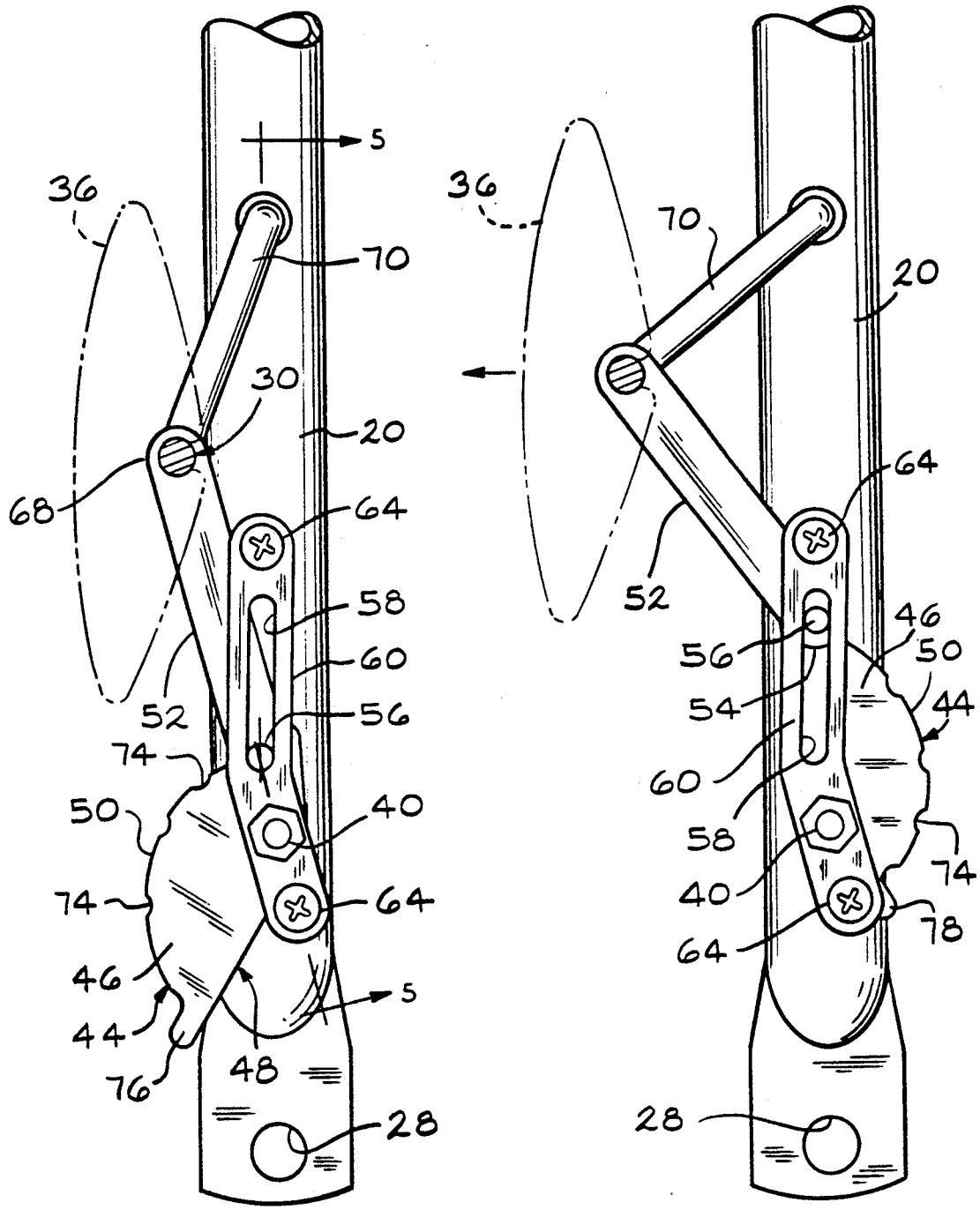

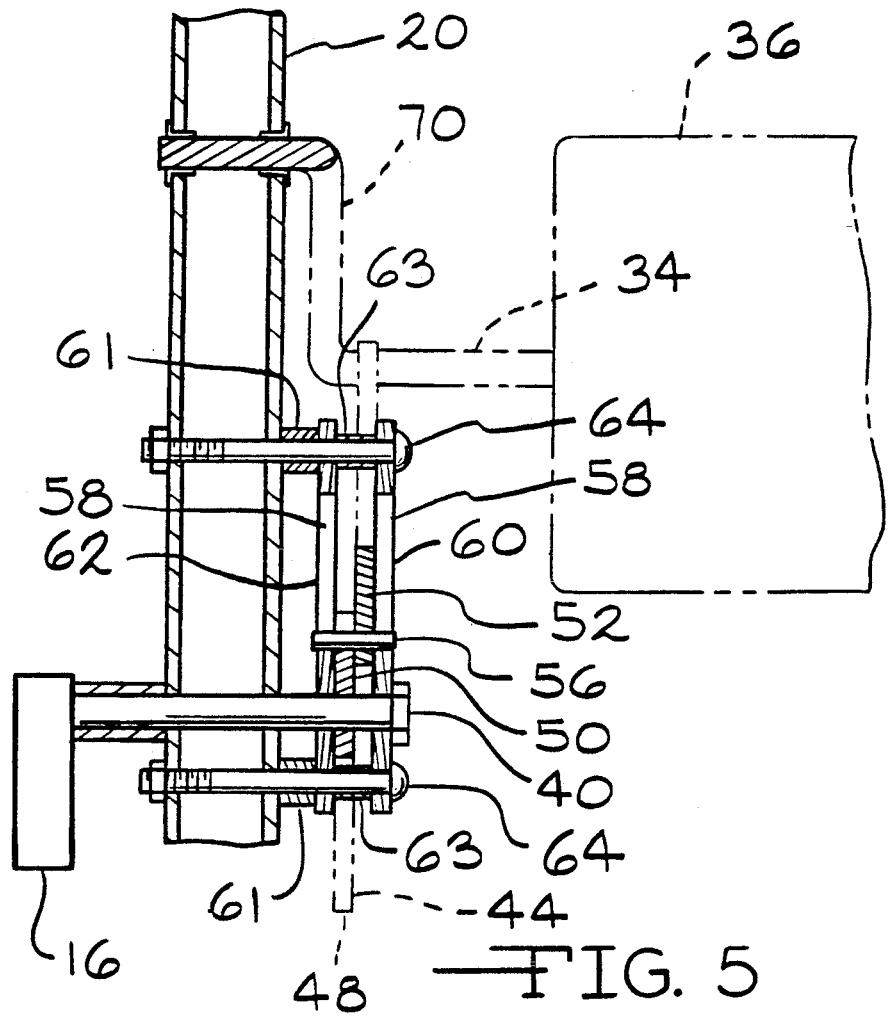

SEAT ASSEMBLY WITH LUMBAR SUPPORT MECHANISM

BACKGROUND OF THE INVENTION

The present invention relates generally to a seat assembly having an adjustable lumbar support and in particular to an improved adjusting mechanism for the lumbar support.

Lumbar supports embodied in the vehicle seat assemblies are well known as illustrated by U.S. Pat. No. 4,725,095. This lumbar support is adjustable and is carried by a bar rotatably mounted to the seat frame for fore and aft movement as the bar is rotated. The adjusted position of the lumbar support member is controlled by a cam rotatably mounted to the seat back frame and engagable with a portion of the lumbar support bar. The cam serves to hold the lumbar support bar in a given position and to rotate the lumbar support bar upon rotation of the cam to adjust the lumbar support.

In order to package the cam and the adjustment mechanism within the seat back, the radius of the cam is limited by the thickness of the seat back. This necessitates the positioning of the cam and its actuating knob in a certain position relative to the lumbar support bar and the lumbar support member. As a result, there is little flexibility in the placement of the actuating knob used to turn the cam. The lumbar support member is naturally positioned adjacent the lumbar region of a seat occupant. The required position of the handle for packaging and proper operation of the mechanism is not necessarily in the best location for reaching and operating by a seat occupant while seated. Typically the position of the actuating knob is higher along the side of the seat back than It is an object of the present invention therefore to provide an adjustment mechanism for the lumbar support member that enables the adjustment knob to be placed at a location that is easily reached by a seat occupant.

It is a further object of the invention to provide such a mechanism that continues to use a rotating cam for simplicity.

It is a feature of the present invention that the adjustment mechanism includes a link having a cam follower at one end for engagement with the cam and connected at the other end to the lumbar support bar. With such a mechanism, the cam and adjustment knob can be located where desired and the link made of whatever length is necessary to couple the lumbar support bar to the cam.

It is a further feature of the adjustment mechanism of the present invention that in a preferred embodiment, the cam control surface does not include stopping detents to hold the cam and lumbar support member in position but rather the control surface is smooth. Stop detents are provided elsewhere on the cam and are engagable with a spring biased plunger to hold the cam and the lumbar support member in position. By providing stop detents separate from the control surface, the pressure acting upon the lumbar support member will have a limited effect on the force required on the actuating knob to adjust the lumbar support. As a result, the adjustment mechanism is smoother and more consistent in its operation.

Further objects, features and advantages of the invention will become apparent from a consideration of the following description and the appended claims when taken in connection with the accompanying drawings.

BRIEF DESCRIPTION OF THE DRAWINGS

FIGS. 3 and 4 are side elevational views..cf the lumbar adjustment mechanism showing different adjusted positions of the lumbar support;

FIG. 5 is a fragmentary sectional view of the lumbar adjustment as seen from the line 5—5 of FIG. 3;

DETAILED DESCRIPTION OF THE INVENTION

Figure 1:
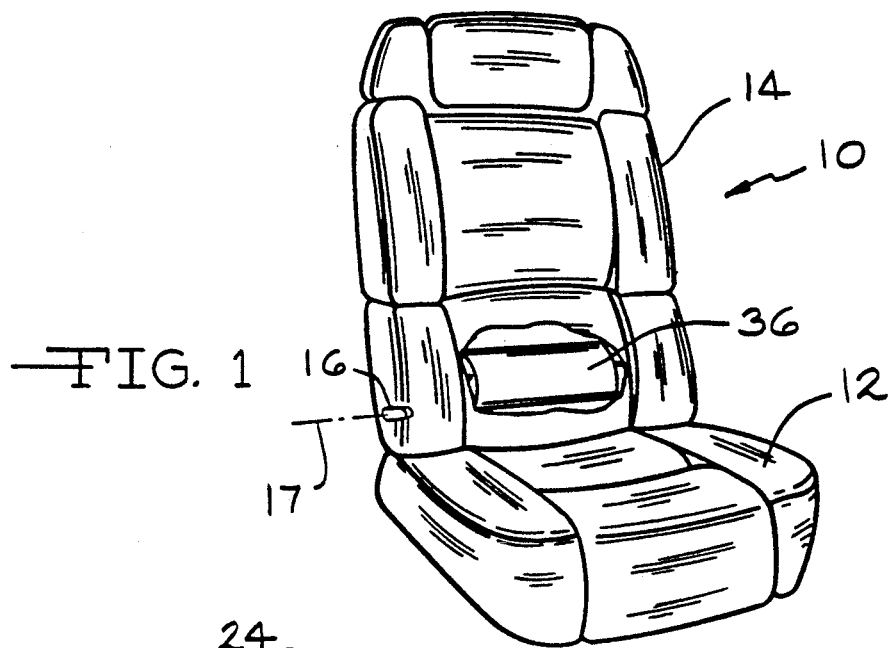
FIG. 1 is perspective view of a seat assembly containing the mechanism or the present invention.
Figure 2:
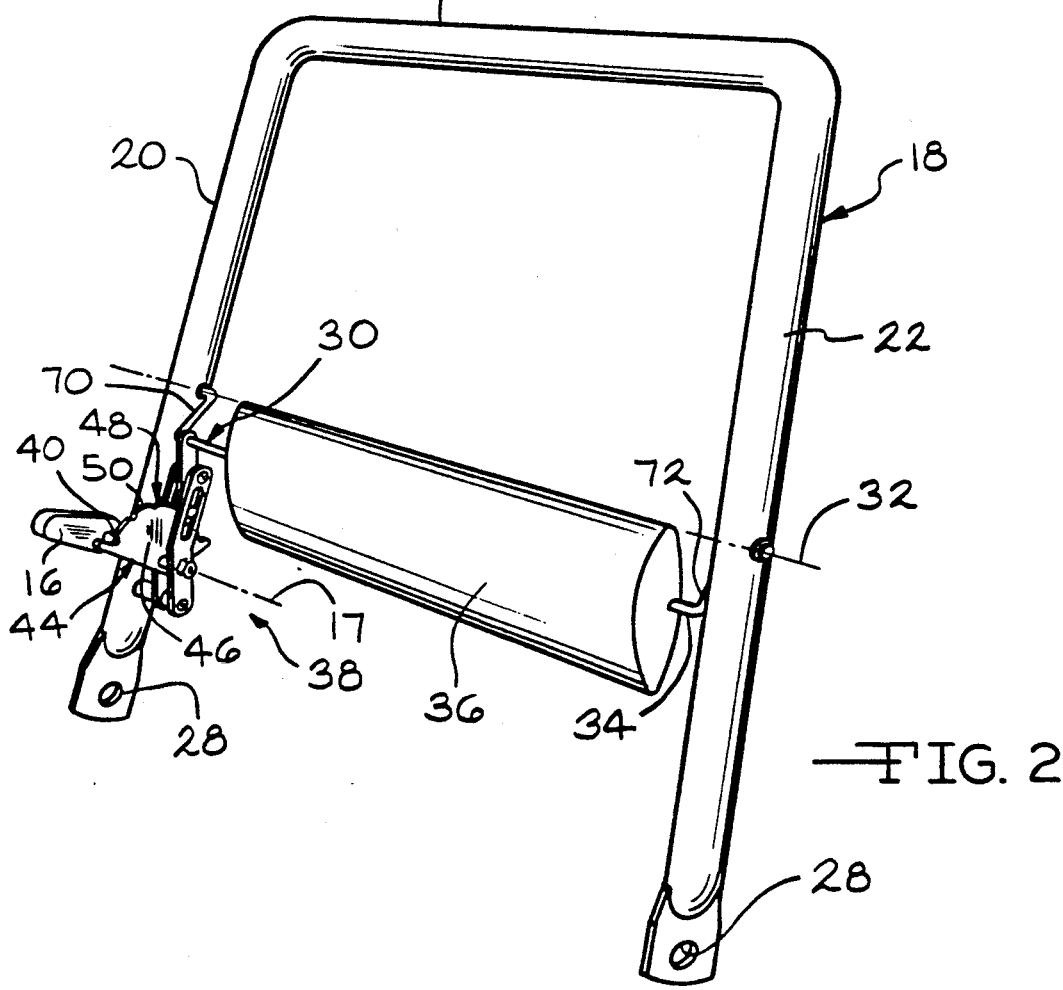
FIG. 2 is a perspective view of the seat back frame of the seat assembly of the present invention.

A seat assembly with the lumbar support mechanism of the present invention is shown in FIG. 1 and designated generally at 10. Seat assembly 10 includes a lower seat cushion 12 and a seat back 14. An adjustable lumbar support mechanism is contained within the seat back and is shown in FIG. 2. A knob or lever 16 extends from one side of the seat back and is rotatable about an axis 17 extending transversely of the seat back for adjustment of the lumbar support mechanism.

The frame 18 of the seat back is shown in FIG. 2. Frame 18 includes a pair of upright members, right upright member 20 and left upright member 22 and an upper cross member 24. The frame 18, at its lower end includes apertures 28 for use in attaching the seat back frame to the lower seat cushion in a conventional manner. The terms left and right used to distinguish between the upright members are not to be interpreted as terms of limitation.

A support bar 30 extends transversely between the two upright members 20 and 22 of the frame and is rotationally mounted to the frame for rotation about the axis 32. The bar 30 includes a mounting portion 34 which is radially displaced from the axis 32 by two radial links 70 and 72 forming the end portions of the bar 30. A lumbar support member 36 is mounted to the mounting portion 34 of the bar 30 so that upon rotation of the bar about axis 32, the lumbar support member 36 will move fore and aft of the frame 18 to provide varying degrees of support to the lumbar region of a seat occupant.

An adjustment mechanism 38 is mounted to the seat back frame and coupled to the bar 30 to effect adjustment of the lumbar support member 36 and to hold the support member in place. Mechanism 38 includes a transverse shaft 40, along the axis 17, extending through the right upright member 20. The handle 16 is mounted to the outboard end of the shaft 40 for grasping by a seat occupant to adjust the lumbar support member. A cam 44 is mounted to the inboard end of the shaft 40 by a spline, weld or the like. The cam is formed of a plate having a pair of parallel faces 46 and an edge 48. A portion of the edge 48 forms a control surface 50 which varies in its radial distance from the shaft 40 as can be seen in FIGS. 3 and 4. A lower link 52 includes a cam follower at its lower end 54 which bears against the control surface 50 of cam 44. As shown in FIG. 5, the cam 44 and the lower link 52 are side by side. A pin 56 extends from the link 54 in both directions. The pin 56 rides on the cam control surface 50 to serve as the cam follower at the end of link 52. Alternatively, the lower edge of the link 52 ride on the cam control surface to form the lower end of the link 52. The motion of the cam follower is guided by the pin 56 extending laterally from the link 52 and through the slots 58 in the two parallel guide plates 60 and 62. The pin 56 is trapped in the two slots.

The two guide plates 60 and 62 are attached by screws 64 or other fasteners to the upright member 20 of the frame 18 and sandwich the lower end 54 of the link 52 between one another. Spacers 61 separate the guide plate 62 from the upright frame member 20 while spacers 63 separate the two guide plates 60 and 62.

The upper end 68 of the lower link 52 is pivotally connected to the bar 30 at the mounting portion 34 of the bar. The end portion of the bar 30 forms an upper link 70 connected at one end to the upright member 20 and connected at its other end to the lower link 52 and to the mounting portion 34 of the bar 30.

As the handle 16 is rotated, the control surface 50 of the cam forces the cam follower at the lower end of link 52 in a linear path along the slots 58 of the guide plates 60 and 62. As the end of lower link 52 is forced up, the upper link 70 is caused to rotate forward as shown in FIGS. 3 and 4. The forward rotation of the upper link 70 results in forward movement of the lumbar support member 36 to increase the degree of support provided thereby. The other end of the bar 30 forms a support link 72 extending radially from the axis 32 and connected to the mounting portion 34 of the bar.

The lower link 52, between the bar 30 and cam 44, enables the cam 44 and handle 16 to be located along the side of the seat back at the optimum position for the handle. Without the use of link 52, the cam 44 would have to be positioned at a particular location relative to the bar 30 to effect rotation of the bar. The link 52 can be made of any length needed to enable the cam to be located where desired for ease of operation.

The control surface 50 includes a plurality of stop detents 74 for seating of the cam follower therein to act as stops to hold the cam and lumbar support member 36 in place. Extensions 76 and 78 project radially outwardly from the control surface 50 to serve as limits to the rotational travel of the cam 44.

Figure 7:
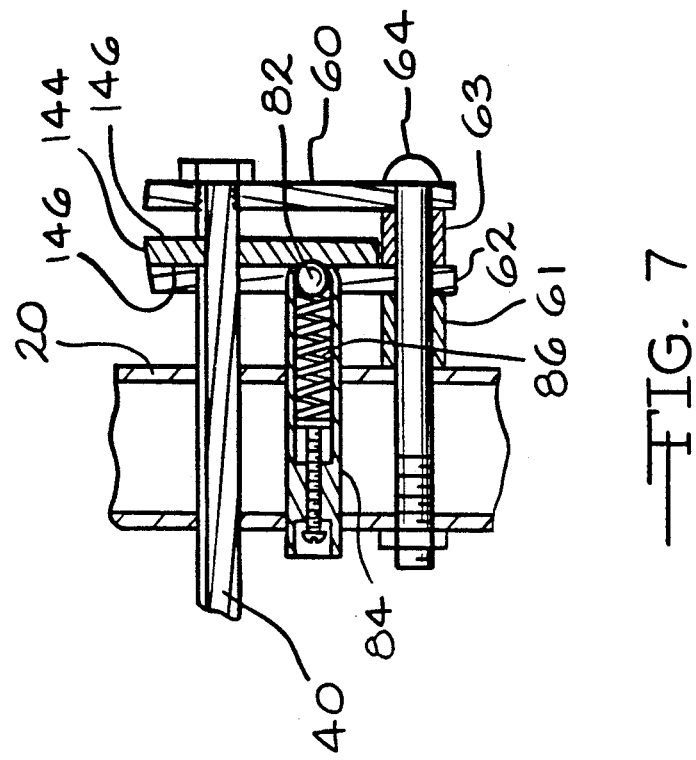
FIG. 7 is a sectional view of the spring biased plunger used to hold the cam of FIG. 6 in the adjusted position.
Figure 6:
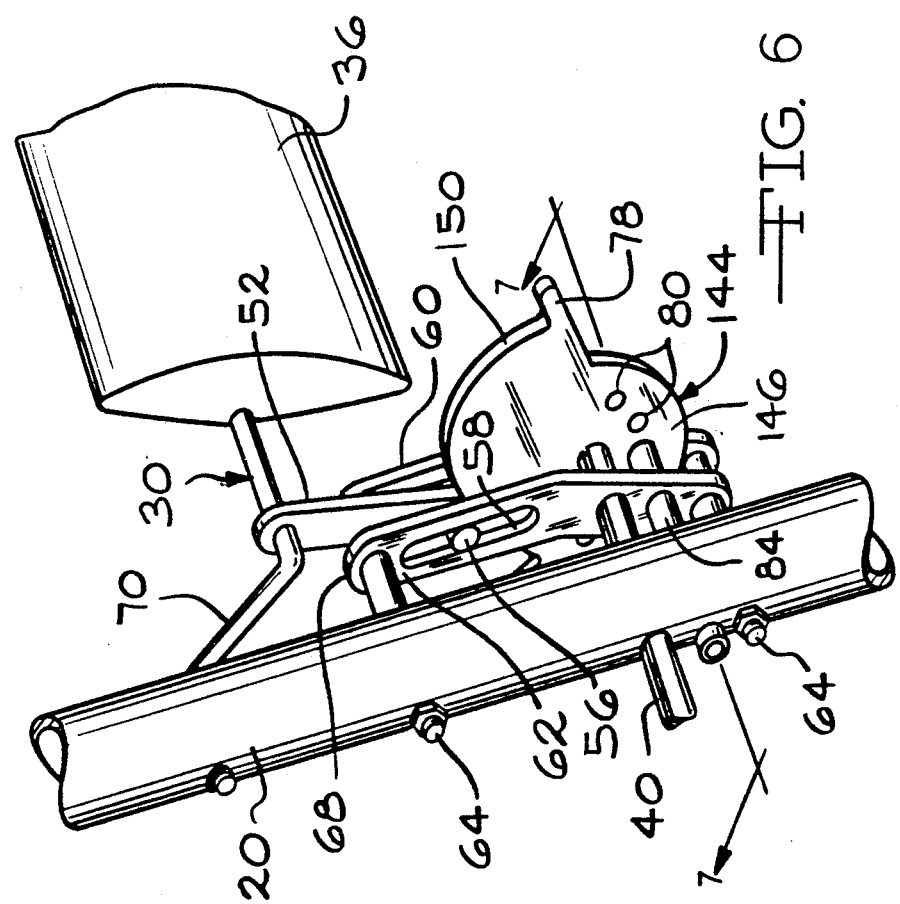
FIG. 6 is a fragmentary perspective view of an alternative embodiment of the cam for adjusting the lumbar support mechanism.

An alternative embodiment of the cam is shown in FIGS. 6 and 7 where identical elements are given the same reference numerals and modified elements are given the same reference numerals with the addition of 100 as compared to the above embodiment. Cam 144, shown in FIG. 6, is provided with a control surface 150 that is substantially smooth, without detents. One face 146 of the cam 144 is provided with a plurality of detents 80 in the form of holes or partial holes which are positioned at a fixed radial distance from the shaft 40. A spring loaded plunger 82 is seated in the detents 80 to hold the cam in place. Plunger 82 is mounted within a housing 84 attached to the upright member 20 and includes a spring 86 for biasing the plunger 82 against one face 146 of the cam. The plunger 82 will seat into each of the detents 80 that are aligned therewith.

The spring biased plunger 82 enables the restraining force on the cam to be independent of the pressure applied to the lumbar support member 36 by the seat occupant. As a result, operation of the adjustment mechanism is smoother and more consistent. The torque needed for adjustment is largely independent of the pressure applied to the lumbar support member 36 and is determined by the forces of spring 86. The modified embodiment shown in FIG. 6 is generally preferred over that shown in FIGS. 2-5 due to its smoother operation.

The lumbar adjustment mechanism of the present invention enables the adjusting handle 16 and cam to be positioned independent of the lumbar support member and connected to the support member by a link 52 of the necessary length. This improves the ease of operating the adjustment mechanism as compared to prior art mechanisms which typically required the handle of the cam to be placed close to the support member and in a location determined by the support member.

It is to be understood that the invention is not limited to the exact construction illustrated and described above, but that various changes and modifications may be made without departing from the spirit and scope of the invention as defined in the following claims.

We claim:

1. A seat assembly comprising:
   a lower seat cushion and a seat back;
   a seat back frame having first and second generally upright members, one upright member being located along each transverse side of said seat back;
   adjustable lumbar support means for a seat occupant comprising a transversely extending lumbar support member with two transverse ends and adjustable means carried by said seat back frame and mounting said lumbar support member for fore and aft movement;
   said adjustable means including a transverse shaft mounted to said first upright member, a handle extending from said seat back for rotating said shaft, a cam mounted to said shaft having a control surface located at a progressively increasing radial distance from said shaft, a cam follower bearing against said cam control surface, guide means for guiding said cam follower as said cam follower moves radially relative to said shaft upon rotation of said cam, a lower link having first and second ends, said first end of said lower link including said cam follower for movement of said line with said cam follower, an upper link having first and second ends, the first end of said upper link being mounted to said first upright member for rotation about an axis, the second ends of both of said lower and upper links being coupled together at a pivoting joint whereby as said cam follower is moved along said guide means, said upper link is rotated about said axis, one end of said lumbar support member being coupled to said upper link, and a support link connected to the other end of said lumbar support member and to said second upright member for rotation about said axis whereby said lumbar support member is moved fore and aft as said upper and support links are rotated about said axis.

2. The seat assembly of claim 1 wherein said guide means includes a pair of spaced apart plates mounted to said first upright member having parallel slots therein entrapping said cam follower for movement therein.

3. The seat assembly of claim 1 wherein said cam has a second surface with a plurality of detents therein; and further comprising a spring biased plunger engagable with said detents to hold said cam in place.

4. The seat assembly of claim 3 wherein said spring biased plunger is mounted to said first upright member.

5. The seat assembly of claim 3 wherein said cam is formed of a plate having a pair of parallel faces and an edge, said control surface being a portion of said edge and said plurality of detents being formed in one of said faces.

6. The seat assembly of claim 1 wherein said upper and support links are portions of a bar attached to said upright members and extending transversely therebetween, said bar having a mounting portion between said upper and support links which is radially spaced from said axis whereby said mounting portion moves fore and aft as said bar is rotated about said axis, said lumber support member being mounted to said mounting portion for fore and aft movement therewith.

7. The seat assembly of claim 1 wherein said cam control surface includes a plurality of defined stop portions located at progressively increasing radial distances from said shaft against which said cam follower bears.

8. The seat assembly of claim 1 wherein said guide means guides said cam follower along a linear path.

9. The seat assembly of claim 8 wherein said linear path along which said cam follower is guided is generally parallel to said upright members.

10. A seat assembly comprising:
a lower seat cushion and a seat back;
a seat back frame having first and second generally upright members, one upright member being located along each transverse side of said seat back;
adjustable lumbar support means for a seat occupant comprising a transversely extending lumbar support member with two transverse ends and adjustable means carried by said seat back frame and mounting said lumbar support member for fore and aft movement;
said adjustable means including a transverse shaft mounted to said first upright member, a handle extending from said seat back for rotating said shaft, a cam mounted to said shaft having a control surface located at a progressively increasing radial distance from said shaft and a second surface separate from said control surface containing a plurality of detents at a fixed radial distance from said shaft, a spring biased plunger engagable with said detents to hold said cam in place, a cam follower bearing against said cam control surface, guide means for guiding said cam follower as said cam follower moves radially relative to said shaft upon rotation of said cam, a lower link having first and seconds ends, said first end of said lower link including said follower for movement of said link with said follower, an upper link having first and second ends, the first end of said upper link being mounted to said first upright member for rotation about an axis, the second ends of both of said lower and upper links being coupled together at a pivoting joint whereby as said cam follower is moved along said guide means, said upper link is rotated about said axis, one end of said lumbar support member being coupled to said upper link, and a support link connected to the other end of said lumbar support member and to said second upright member for rotation about said axis whereby said lumbar support member is moved fore and aft as said upper and support links are rotated about said axis.

11. The seat assembly of claim 10 wherein said upper and support links are portions of a bar attached to said upright members and extending transversely therebetween, said bar having a mounting portion between said upper and support links which is radially spaced from said axis whereby said mounting portion moves fore and aft as said bar is rotated about said axis, said lumbar support member being mounted to said mounting portion for fore and aft movement therewith.

12. The seat assembly of claim 10 wherein said guide mean a pair of spaced apart plates mounted to said first upright member having parallel slots therein entrapping said cam follower for movement therein.

13. The seat assembly of claim 10 wherein said cam is formed of a plate having a pair of parallel faces and an edge, said control surface being a portion of said edge and said second surface containing said plurality of detents being one of said pair of parallel faces.

* * * * *

UNITED STATES PATENT AND TRADEMARK OFFICE
CERTIFICATE OF CORRECTION

PATENT NO. : 5,286,087
DATED : February 15, 1994
INVENTOR(S) : Robert D. Elton

It is certified that error appears in the above-indentified patent and that said Letters Patent is hereby corrected as shown below:

In Column 1, line 35, after "than", insert --can be easily reached by a seated occupant--.

In Column 2, line 6, after "the" insert --lumbar--, and after "mechanism" delete "or" and insert --of--.

In Column 3, line 4, after "52" and before "ride" insert --can--.

In Column 4, line 44, Claim 1, after "said", delete "line" and insert --link--.

In Column 6, line 34, Claim 12, delete "means" and insert in place thereof --means includes--.

Signed and Sealed this

Nineteenth Day of July, 1994

BRUCE LEHMAN

Attest:

Attesting Officer

Commissioner of Patents and Trademarks

UNITED STATES PATENT AND TRADEMARK OFFICE
CERTIFICATE OF CORRECTION

PATENT NO. : 5,286,087
DATED : February 15, 1994
INVENTOR(S) : Robert D. Elton, Thomas F. Kracht It is certified that error appears in the above-indentified patent and that said Letters Patent is hereby corrected as shown below:

On the title page, the following should be inserted after "mich.,"
--Thomas F. Kracht, Canton, Mich.

Signed and Sealed this

Twentieth Day of December, 1994

Attest:

BRUCE LEHMAN

Attesting Officer     Commissioner of Patents and Trademarks